UNITED STATES PATENT OFFICE.

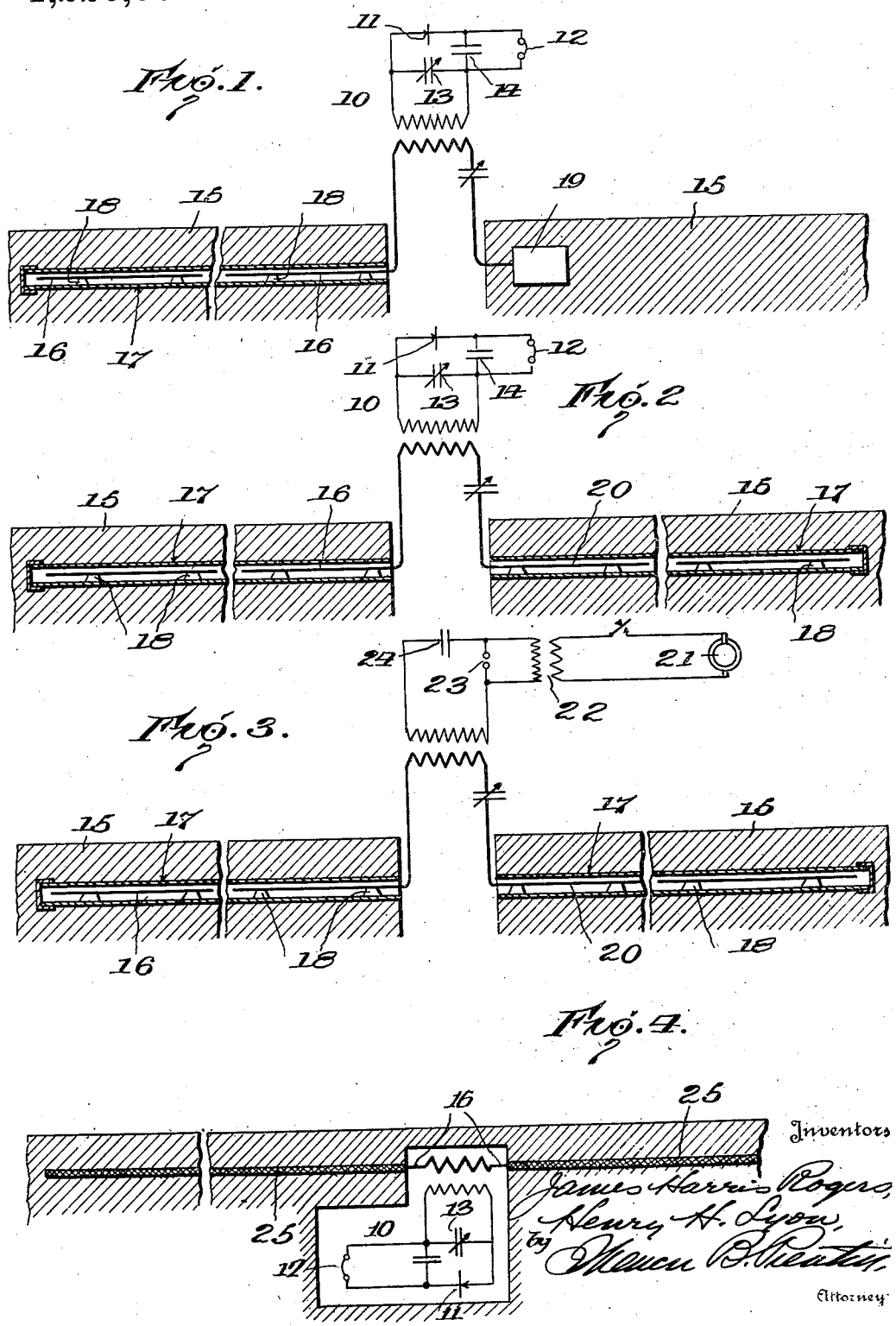

JAMES HARRIS ROGERS AND HENRY H. LYON, OF HYATTSVILLE, MARYLAND.

WIRELESS SIGNALING SYSTEM.

1,220,005.   Specification of Letters Patent.   Patented Mar. 20, 1917.

Application filed November 10, 1916. Serial No. 130,602.

*To all whom it may concern:*

Be it known that we, JAMES H. ROGERS and HENRY H. LYON, citizens of the United States, residing at Hyattsville, in the county of Prince Georges and State of Maryland, have invented new and useful Improvements in Wireless Signaling Systems, of which the following is a specification.

Our invention relates to the transmission of electrical impulses or oscillations to a distance, primarily for the purpose of conveying intelligence, and it pertains to means for both sending and receiving.

In systems of wireless sending and receiving now in general use, one or more conductors or capacities are employed disposed above the surface of the earth, which conductors or capacities serve to radiate or receive the impulses in the sending or receiving of messages. Such elevated conductors are costly to erect and maintain, as to obtain efficiency and long-distance transmission it is necessary to have them at considerable distance above the surface of the earth. This necessitates expensive towers and masts, and moreover both the conductors and the towers or masts are exposed to weather conditions—wind storms, lightning, snow and ice—which often impede or entirely prevent the operative use of the system. We are aware that it has been proposed also to employ a conductor elevated above the earth in connection with a buried conductor.

Our invention has for its principal object the provision of a system not subject to the above objections; a system in which the communication, both sending and receiving, is clear and effective; in which the communication is selective and the direction of transmission may be readily determined; in which multiple transmission may be effected; and in which the sending and receiving of messages to and from stations on land and on water may proceed independent of weather conditions.

We have discovered that signals can be sent and received with great facility by the employment of wires buried beneath the surface of the earth but insulated therefrom substantially throughout their length and extending in direction substantially parallel to the earth's surface, so that while the wires are not in direct contact with the earth they are intimately associated therewith.

The invention consists in the novel features and combinations of circuits and apparatus in the wireless signaling system hereinafter described and claimed, and illustrated in diagram in the accompanying drawings, in which—

Figure 1 is a system in which a single antenna is shown below the surface of the earth, but insulated therefrom by being mounted within a conduit;

Fig. 2 is a similar view showing two antennæ extending in opposite directions;

Fig. 3 is a view similar to Fig. 2, but with the instruments of a sending station; and Fig. 4 is a similar view showing in whole lines the antennæ consisting of insulated wire buried below the surface of the ground.

Referring to the drawings, signal instruments are indicated at 10, and in Figs. 1 and 2 are those of the receiving station, while in Fig. 3 the instruments of a sending station are shown. In Figs. 1 and 2, 11 is a detector of any type, preferably an audion, 12 a telephone, and 13 and 14 are the usual condensers. Any desired type of instruments and arrangement of connecting circuits may be employed.

The surface of the earth is indicated at 15, and the antenna at 16. This latter extends in a direction substantially horizontal, and as shown in the figures is preferably buried below the surface of the earth. Referring particularly to Fig. 1, the antenna is mounted within a conduit or pipe 17, preferably of any suitable non-conducting material such as terra cotta. The mounting within the conduit may be of any preferred type, that shown being by mounting the antenna upon a series of lugs or projections 18 extending upwardly from the bottom of the conduit. From the end of the conduit connection is made between the antenna and the signal instruments. The antenna is thus intimately associated with the earth throughout its length but is insulated therefrom and, it is believed, a considerable portion of the earth's surface about the antenna thus coöperates with the latter in sending or receiving oscillations.

The coöperation of the antenna with a ground connection or a second antenna is desirable for proper transmission or reception of signals, and in Fig. 1 we have therefore shown the other side of the instruments connected to ground plate 19.

Fig. 2 is an embodiment of the invention in which two antennæ are employed extending in opposite directions, the second antenna 20 being connected in place of the ground plate shown in Fig. 1. This arrangement is more effective than with the use of the ground plate.

In order to obtain the maximum efficiency it is desirable to have the antennæ disposed in a line at right angles to the wave fronts, and in order that this may be accomplished for the different directions a plurality of antennæ are employed extending outwardly in different directions but substantially horizontal and parallel to the surface of the earth, and under the surface as already explained. This arrangement is fully set forth in our application Serial No. 130,603, filed November 10, 1916, to which reference is made for complete details. It is therefore thought unnecessary to illustrate or describe such arrangements in the present application.

Fig. 3 shows the same arrangement as Fig. 2, but with sending instruments instead of receiving instruments. These latter comprise a generator 21, transformer 22, spark gap 23 and condenser 24. Any other sending arrangement and instruments may be employed instead of those shown.

Referring now more particularly to Fig. 4, in place of the conduit or pipe, an ordinary insulating envelop for the antenna is shown at 25, and for this purpose the antenna may be an ordinary insulated wire of the proper size and length. It may be buried beneath the surface of the earth, as already explained.

The invention is also applicable to the surface of the earth where there is water. For instance, on the sea coast the antennæ may be run out from the shore into the water, and although insulated from the latter it is so closely associated therewith that there is a coöperation between the antenna and the surrounding water in the sending and receiving of oscillations. The insulated antenna may also be employed for sending and receiving signals to and from vessels in the manner fully set forth in our above mentioned application, it being believed unnecessary to fully describe these arrangements here.

In accordance with the patent statutes we have described what we now believe to be the best embodiment of the invention, but we do not wish to be understood thereby as limiting ourselves or the scope of the invention, as many changes and modifications may be made without departing from the spirit of the invention and all such we aim to include in the scope of the appended claims.

For instance throughout the several figures, the signal instruments are shown associated with the antenna or antennæ by indirect coupling, but may be associated therewith in any other manner desired.

It will be seen also that while the signal instruments are shown diagrammatically above the earth, they will in practice often be actually located in a pit below the ground level or entirely underground between the antennæ, as shown in Fig. 4. When the antennæ are entirely underground, the effects of lightning on the receiving of signals are nearly eliminated, so that only slight clicks are heard instead of loud prolonged hissing.

It will be understood that the system works with either sustained oscillations or damped wave trains.

What we claim and desire to secure by Letters Patent of the United States, is—

1. A wireless transmission and reception system comprising an antenna extending in direction substantially parallel to and buried under the surface of the earth but insulated therefrom substantially throughout its length.

2. A wireless signaling system comprising electromagnetic wave signal instruments, an antenna extending outwardly therefrom, a second antenna extending in the opposite direction, said antennæ being parallel to and buried under the surface of the earth but insulated therefrom substantially throughout their length, said instruments being connected between said antennæ.

3. A wireless transmission and reception system comprising an antenna extending in direction substantially parallel to and buried under the surface of the earth and a conduit in which said antenna is insulated substantially throughout its length from the earth.

In testimony whereof we have hereunto set our hands in presence of two subscribing witnesses.

JAMES HARRIS ROGERS.
HENRY H. LYON.

Witnesses:
JOHN GIBSON,
S. WILLIAM FORD.